United States Patent
Soderberg

(10) Patent No.: US 7,357,145 B2
(45) Date of Patent: Apr. 15, 2008

(54) HIGH-PRESSURE, HEMI-WEDGE CARTRIDGE VALVE

(75) Inventor: Paul B. Soderberg, deceased, late of Montgomery, TX (US); by Jeannette Soderberg, legal representative, Montgomery, TX (US)

(73) Assignee: Hemiwedge Valve Corporation, Conroe, TX (US)

( * ) Notice: Subject to any disclaimer, the term of this patent is extended or adjusted under 35 U.S.C. 154(b) by 150 days.

(21) Appl. No.: 11/360,150

(22) Filed: Feb. 23, 2006

(65) Prior Publication Data

US 2006/0196544 A1 Sep. 7, 2006

Related U.S. Application Data

(60) Provisional application No. 60/658,548, filed on Mar. 4, 2005.

(51) Int. Cl.
*F16K 43/00* (2006.01)

(52) U.S. Cl. .............. 137/15.22; 137/315.18; 137/454.6

(58) Field of Classification Search ........... 137/315.18, 137/454.2, 454.6, 15.22; 251/315.12
See application file for complete search history.

(56) References Cited

U.S. PATENT DOCUMENTS

| | | | |
|---|---|---|---|
| 3,888,460 A | * | 6/1975 | Sigmon ................. 137/315.18 |
| 3,990,676 A | | 11/1976 | Brownstein |
| 4,015,818 A | | 4/1977 | Tawakol |
| 4,587,990 A | * | 5/1986 | Pennell et al. ........... 137/454.2 |
| 4,718,444 A | | 1/1988 | Boelte |
| 4,962,911 A | | 10/1990 | Soderberg |
| 4,971,099 A | | 11/1990 | Cyvas |
| 5,135,019 A | * | 8/1992 | Dupont ................ 137/15.22 |
| 5,145,150 A | | 9/1992 | Brooks |
| 5,333,834 A | | 8/1994 | Soderberg |
| 6,648,001 B2 | | 11/2003 | Chatufale |
| 2001/0045231 A1 | | 11/2001 | Monod |
| 2002/0036279 A1 | | 3/2002 | Chatufale |
| 2004/0113115 A1 | | 6/2004 | Ozawa |
| 2004/0178381 A1 | | 9/2004 | Sundararajan |

* cited by examiner

*Primary Examiner*—Kevin Lee
(74) *Attorney, Agent, or Firm*—Claude E. Cooke, Jr.; Burleson Cooke L.L.P.

(57) ABSTRACT

A valve having a cartridge that fits within the valve housing and that may be replaced without removing the valve housing from adjoining equipment. The cartridge contains a wedge having curved surfaces and a driver to rotate the wedge from an open to a closed position. When the wedge rotates to the closed position a seal is formed on the convex surface of the wedge and a sealing assembly is moved to form a seal around the outlet of the valve housing.

39 Claims, 5 Drawing Sheets

HIGH-PRESSURE, HEMI-WEDGE CARTRIDGE VALVE

CROSS-REFERENCE TO RELATED APPLICATIONS

This application claims the benefit of U.S. Provisional Application No. 60/658,548, filed Mar. 4, 2005.

STATEMENT REGARDING FEDERALLY SPONSORED RESEARCH OR DEVELOPMENT

Not applicable.

BACKGROUND OF THE INVENTION

1. Field of the Invention

The present invention generally relates to an improved valve for use in the control of fluids in a pipeline. The valve of the present invention is particularly useful in high pressure pipelines. More specifically, the present invention is directed to a new, novel and non-obvious valve in which the valve components are housed in a cartridge which facilitates repair by permitting quick removal and replacement without requiring that the housing of the valve be removed from the pipeline.

2. Description of Related Art

Ball valves, plug valves and the like are well known to those skilled in the art. A common characteristic of these valves is that they may be moved between their fully open and fully closed positions by quick rotation through an angle of not more than about ninety degrees (90 degrees).

A simple plug valve comprises a rotatable, tapered plug having a bore therethrough disposed in a complementary housing. The plug valve permits fluid flow to be fully stopped by rotating the plug not more than about ninety degrees (90 degrees). However, these valves offer only minimal graduated control of fluid flow achieved by setting the plug at intermediate positions. Further, plug valves require modification for use in high-pressure environments.

A ball valve comprises a rotatable ball having a bore therethrough corresponding to the fluid flow path, together with a seat for sealing with the ball surface. Ball valves operate similarly to the previously described plug valves and offer similar advantages and disadvantages.

Presently lesser known, but offering significant advantages over conventional ball and plug valves, is my hemi-wedge valve described in U.S. Pat. No. 4,962,911, which is hereby incorporated by reference. In short, the hemi-wedge valve includes a curved wedge comprising a tapered, spherical thin section rotatable through the fluid path together with a fixed thrust ball for displacing the distal side of the wedge longitudinally toward the seat as the wedge is rotated between its open and closed positions.

The hemi-wedge comprises a wedge having curved sides so that a first, convex side forms a curved sealing surface with the seat of the valve and a second, concave side forms a curved thrust surface for cooperation with a complementary curved, fixed surface on the thrust ball. An important feature of the hemi-wedge valve is the fact that the thickness of the wedge increases from its leading end to its trailing end. The wedge includes a bore forming a part of the fluid path through its thinner, leading end and is solid at its thicker, trailing end. Rotation of the hemi-wedge through about ninety degrees (90 degrees) into the fluid path gradually closes the fluid path by blocking it with the thicker, solid end of the wedge.

An improvement for use with the hemi-wedge valve described in U.S. Pat. No. 4,962,911 is my valve driver described in U.S. Pat. No. 5,333,834, which is hereby incorporated by reference. This valve driver can turn the rotatable valve member of a ball, plug or hemi-wedge valve. The improved valve driver combines the features and advantages of a conventional free-floating valve element with those of a conventional valve element rigidly connected to an actuator and trunnion. The valve described in U.S. Pat. No. 5,333,834 provides a rotatable valve member which is maintained centered along the actuator axis to avoid cocking while being sufficiently free to float into sealing engagement with the valve seat. These benefits are achieved by loosely holding the rotatable valve member within the yoke or cradle of the valve driver described therein.

One common shortcoming of the foregoing valves is that they do not facilitate quick and easy repair or maintenance in the field. Typically, in order to repair or replace a failed component, e.g., a leaking seat, the entire valve must be removed from a pipeline. Such a repair procedure is generally expensive, time-consuming and often requires disassembly of a portion of the pipeline to completely remove the valve housing and install a new or rebuilt valve. With the valve housing often having been welded or bolted into place, it is necessary to shut down the pipeline, remove the housing, repair or replace the valve, install a new or repaired valve and perform appropriate tests to ensure that the integrity of the pipeline has not been compromised.

Accordingly, there has been a long-felt, but unfulfilled need for an improved valve incorporating an easily replaceable cartridge assembly which may be quickly and easily removed and replaced in a valve body without requiring any cutting of the pipeline. Those skilled in the art have long sought and will appreciate the novel and non-obvious features of the present invention and the improved valve resulting therefrom.

BRIEF DESCRIPTION OF THE SEVERAL VIEWS OF THE DRAWINGS

Other features and intended advantages of the present invention will be more readily apparent by reference to the following detailed description in connection with the accompanying drawings wherein.

While the invention will be described in connection with the presently preferred embodiment, it will be understood that it is not intended to limit the invention to this embodiment. On the contrary, it is intended to cover all alternatives, modifications and equivalents as may be included in the spirit of the invention and as defined in the appended claims.

DETAILED DESCRIPTION OF THE INVENTION

The present invention presents a new, novel and non-obvious, high-pressure, hemi-wedge cartridge valve. In the valve of the present invention, the valve components are housed in a cartridge which may be easily removed from the valve housing without requiring that the housing be detached from a pipeline. In the valve of the present invention, the rotatable valve member, preferably a hemi-wedge valve, is disposed within a cartridge to permit rapid repair of damaged valves by merely removing the housing cover, replacing the cartridge and re-installing the valve cover. While the preferred embodiment of the present invention comprises a hemi-wedge valve, the cartridge design of the present invention may also be employed with conventional ball and plug valves.

Figure 1:
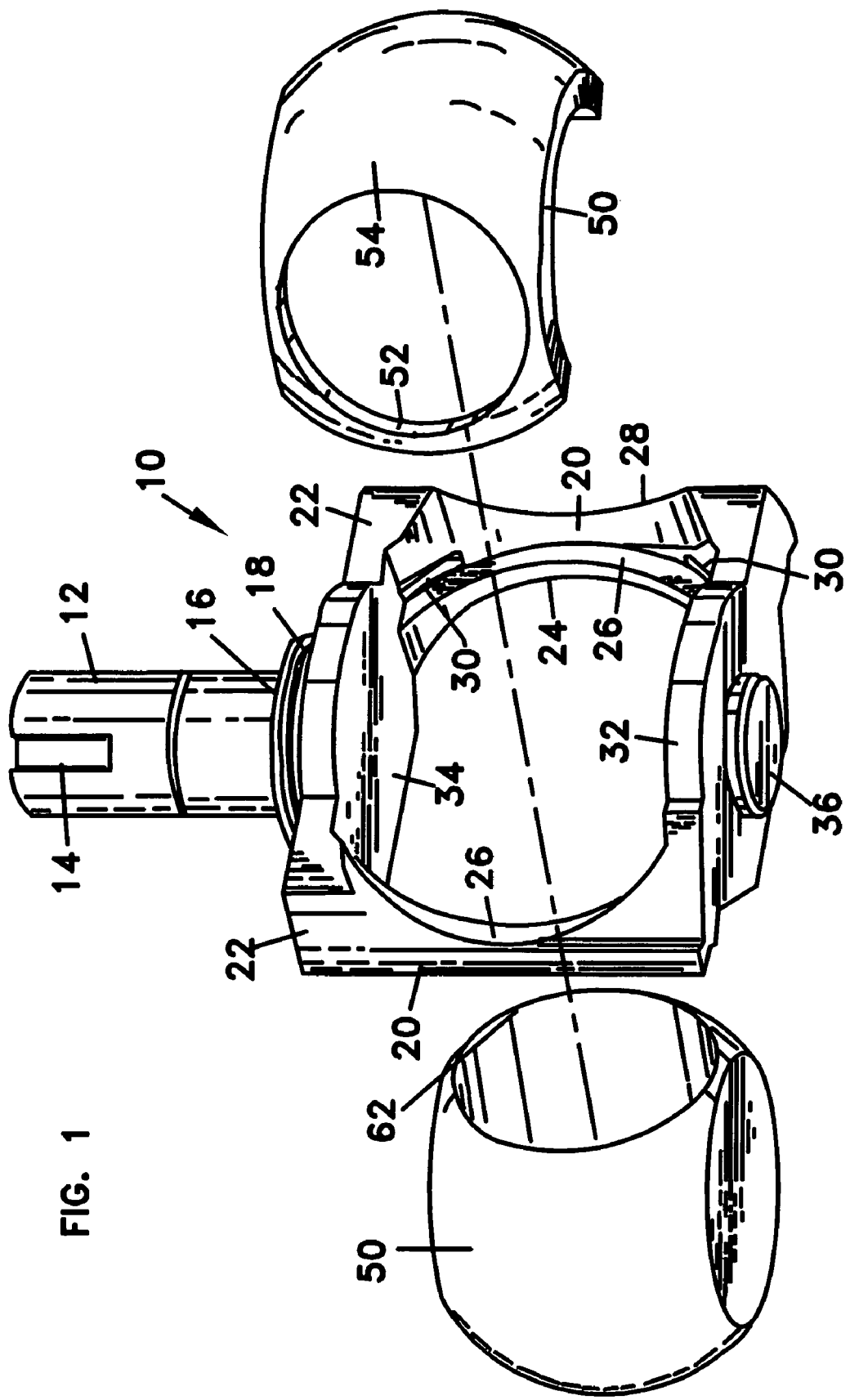
FIG. 1 is an exploded perspective view illustrating a valve driver, thrust ball and hemi-wedge for use in a high-pressure, hemi-wedge cartridge valve in accord with the present invention as illustrated in FIG. 4.
Figure 2:
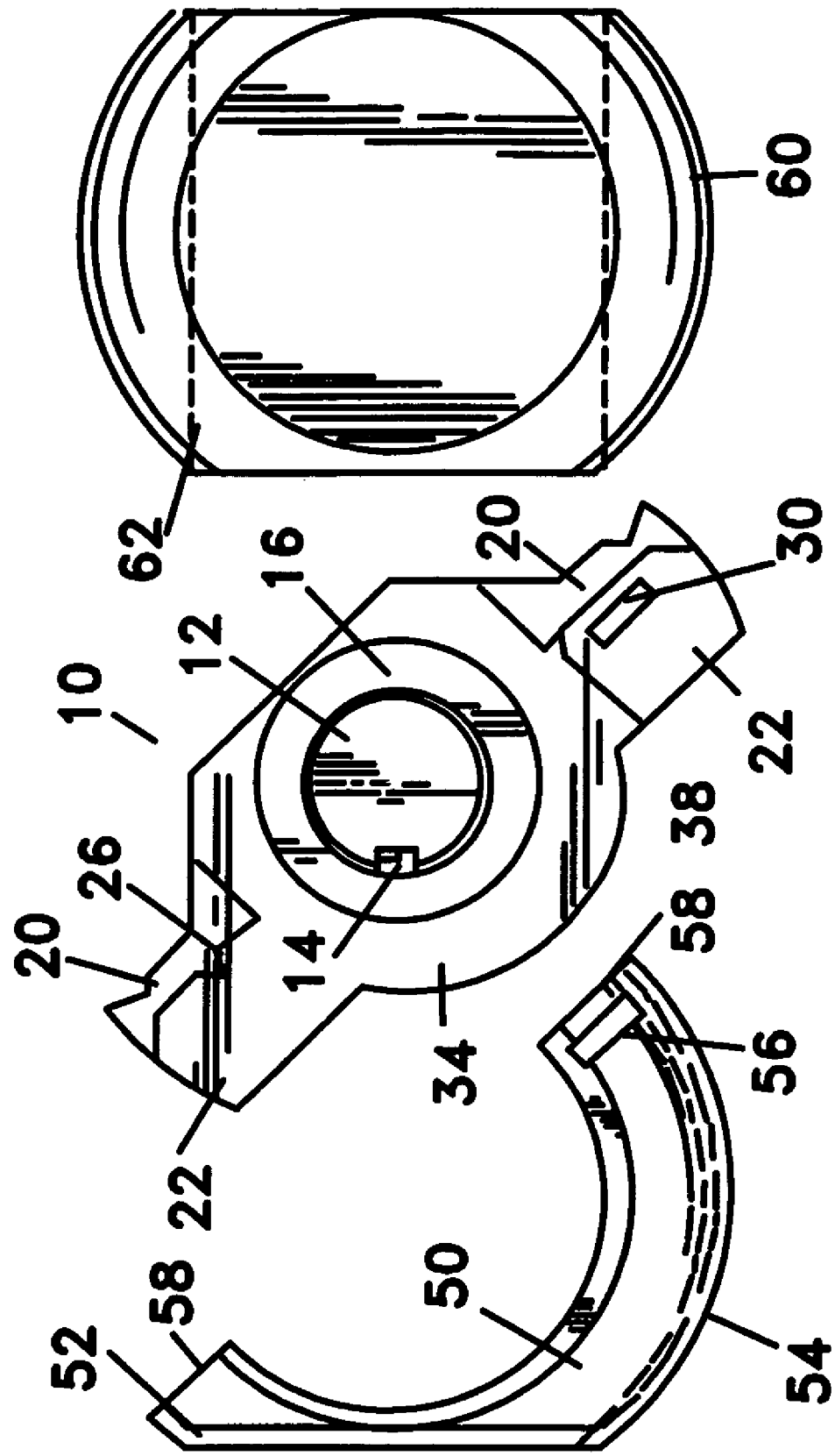
FIG. 2 is a top view illustrating from left to right the hemi-wedge, driver and thrust ball of FIG. 1 for use in a high-pressure, hemi-wedge cartridge valve in accord with the present invention as illustrated in FIG. 4.
Figure 3:
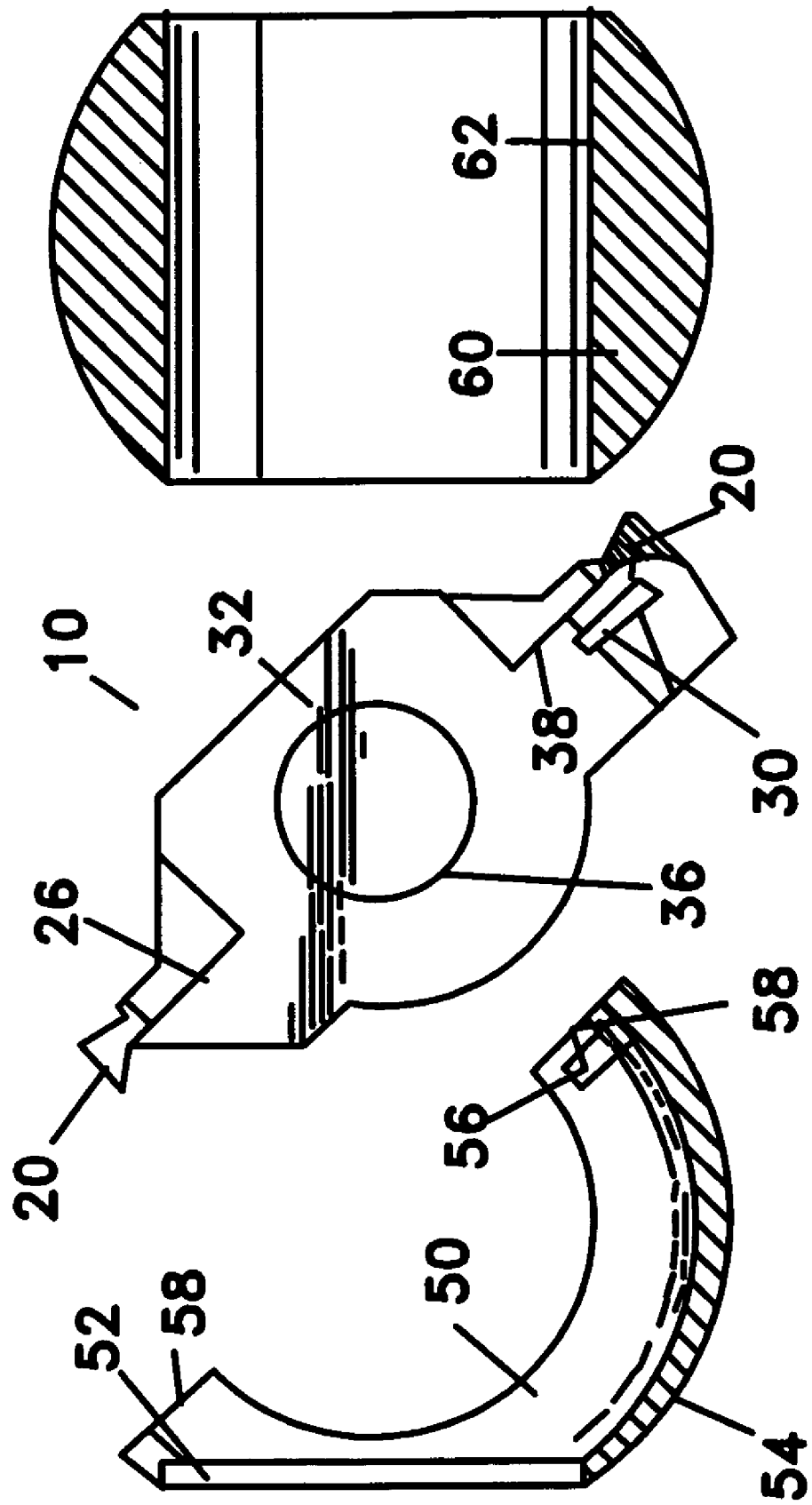
FIG. 3 is a cross-sectional illustration from left to right of the hemi-wedge, driver and thrust ball of FIGS. 1 and 2.

A presently preferred embodiment of a hemi-wedge, valve driver and thrust ball for use in the present invention is illustrated in FIGS. 1-3. These figures illustrate a hemi-wedge 50 and thrust ball 60 typical of those disclosed in connection with my improved hemi-wedge valves described and claimed in U.S. Pat. Nos. 4,962,911 and 5,333,834, which have been incorporated herein by reference. The construction, operation and advantages of my hemi-wedge valve are set forth in detail in the specifications of those patents. Those unfamiliar with my hemi-wedge valve are referred thereto.

Briefly, the hemi-wedge valve is opened and closed by rotation of hemi-wedge 50 through an angle of about ninety degrees (90 degrees) over the curved surface of thrust ball 60. Hemi-wedge 50 moves in response to rotation of driver 10. As the thicker, trailing edge of hemi-wedge 50 is rotated into the fluid path, thrust ball 60 forces the leading or distal surface of hemi-wedge 50 to the left and convex surface 54 into sealing engagement with a seat on the outlet side of the housing (not shown).

Valve driver 10 of the present invention comprises drive stem 12 having keyway 14 at one end thereof for cooperation with any conventional external actuator (not shown). Drive stem 12 is connected at its opposite end with a driver 10 having a top plate 34 with shoulders 22 from which arms 20 are suspended. Arms 20 are positioned to straddle the fluid flow path through the valve. In the presently preferred embodiment, arms 20 are positioned so that they do not enter or cross the fluid path during rotation of the rotatable valve member, e.g., hemi-wedge 50, between its open and closed positions. In the presently most preferred embodiment, arms 20 are joined around the fluid flow path to bottom plate 32 of driver 10. In that embodiment, driver 10 further includes a trunnion 36 on the exterior of bottom plate 32 and aligned with drive shaft 12 for use in centering both the driver and carried rotatable valve member within the valve. Central opening 24 between arms 20 of driver 10 is designed to receive thrust ball 60. Thrust ball 60 includes central bore 62 that forms a part of the fluid pathway through the valve.

Optionally, driver 10 further includes one or more dogs 30 positioned to engage cooperating slots 56 in hemi-wedge 50. See FIGS. 2 and 3. Dogs 30, along with contact surfaces 26 and 38, transmit the actuating force applied to driver 10 to the rotatable valve member, e.g., hemi-wedge 50. Dogs 30 are smaller than slots 56 so that they are able to move freely therein. Accordingly, dogs 30 do not rigidly connect arms 20 and driver 10 to hemi-wedge 50. Thus, the rotatable valve member, e.g., hemi-wedge 50, is free to float to seek the best seal. In a presently preferred embodiment, a plurality of dogs 30 is employed to more evenly distribute the actuating force applied to hemi-wedge 50 by drive element 18.

Contact surfaces 26 of drive element 18 contact and push contact surfaces 58 of hemi-wedge 50 between the open and closed positions. When closing the valve, the actuating force is transmitted through driver 10 to hemi-wedge 50 via contact surface 38 to push hemi-wedge 50 to the closed position. When opening the valve, the actuating force is transmitted through driver 10 to hemi-wedge 50 via contact surface 26 to push hemi-wedge 50 to the open position. However, the opening force is also transmitted to hemi-wedge 50 via dogs 30 which pull the hemi-wedge via slots 56. By both pushing and pulling the hemi-wedge, driver 10 prevents the hemi-wedge from becoming cocked. It should be noted that the preceding description of a hemi-wedge valve is provided merely as an example, and any number of valve designs known in the art are acceptable for use with the present invention.

As previously mentioned, the components forming the valve of the present invention are housed in an easily removable cartridge. The main internal components of valve cartridge 400 according to the present invention are illustrated in exploded perspective in FIG. 4. Within valve cartridge 400 is a hemi-wedge valve assembly of the type previously described with reference to FIGS. 1-3. This assembly includes valve driver 10, drive stem 12, hemi-wedge 50 and thrust ball 60.

Figure 4:
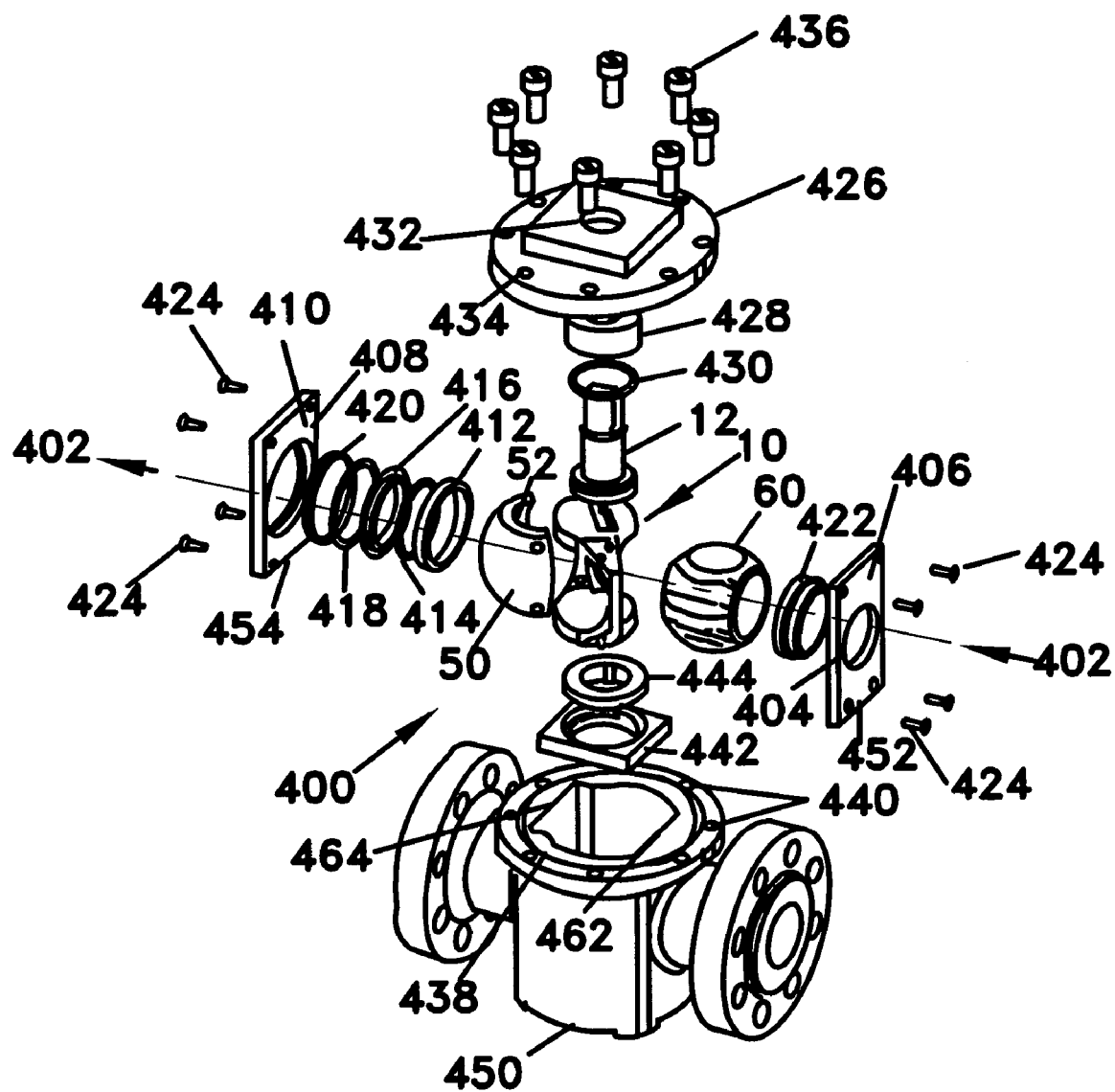
FIG. 4 is an exploded perspective view of a high-pressure, hemi-wedge cartridge valve in accord with the present invention illustrating its main, internal components.

In FIG. 4 fluid pathway 402 is illustrated extending from fluid inlet 404 in inlet retainer plate 406, through thrust ball 60 and on to fluid outlet 408 in seat plate 410. As will be understood by those skilled in the art, when the hemi-wedge 50 is positioned so that bore 52 is disposed in the fluid path, i.e., in an open position, fluid may flow through cartridge 400 via fluid pathway 402.

Disposed along the fluid pathway 402 between thrust ball 60 and inlet retainer plate 406 is spacer 422 which helps maintain the position and spacing of thrust ball 60 within fluid pathway 402. The inlet retainer plate 406 provides a wall for retaining the components of cartridge 400 on the inlet side and includes a bore therethrough forming fluid inlet 404. On the outlet side of cartridge 400, outlet retainer plate 410 holds the seat assembly 412-420 in place, while allowing fluid to exit cartridge 400 through fluid outlet 408. Forming the bottom of cartridge 400 is base plate 442. Any conventional fastening means, e.g., screws 424, may be used to secure the inlet and outlet retainer plates 406, 410 to base plate 442 and to a similar top plate (not shown) extending from the bottom of bonnet 426. Those skilled in the art will recognize that cartridge 400 also may include optional side plates (not shown) affixed between plates 406 and 410 to fully enclose the valve assembly within cartridge 400.

Extending along the fluid pathway 402 from hemi-wedge 50 in the direction of outlet retainer 410 is a seat assembly comprising a set of elements 412-420 that aid in providing a high-pressure seal when the hemi-wedge 50 is in the closed position. In physical contact with the hemi-wedge 50 is a seat 414 which provides the seal in the closed position. While it is preferred that seat 414 be formed of metal to provide a tight metal-to-metal seal, other materials suitable for the intended operating environment, e.g., O-rings made of rubber or hard plastics such as polytetrafluoroethylene (PTFE such as Teflon®) might be used. Seat 414 is disposed in an appropriate groove on the inlet side of spacer 416. Surrounding seat 414 is retaining ring 412 which helps maintain seat 414 in place, preventing blow out of the seat during opening and closing of hemi-wedge 50.

On the opposite or outlet side of spacer 416 is a second groove for receiving another seal element 418. Like seat 414 seal element 418 is an O-ring which may be formed of any appropriate material, e.g., rubber, plastic such as PTFE or metal. Seal element 418 is maintained in place by retaining ring 420. When installing the cartridge 400 into housing 450, the complete seat assembly must be disposed fully within the periphery of the cartridge, i.e., seal 418 cannot extend beyond the exterior surface of outlet retaining plate 410 through outlet 408. After installation, however, and upon closing of the valve, the seat assembly, and particularly seal 418 may be forced outwardly through outlet 408 beyond the exterior surface of plate 410 to provide a seal about the outlet of housing 450.

The dimension of multi-element seat assembly 412-420 along the fluid flow path can be easily adjusted to the exact length required for any particular valve cartridge by selecting spacer 416 from a plurality of spacers having different thicknesses. Thus, minor differences in dimensions between valves can be easily accommodated while maintaining the desired tolerances. Using a simple repair kit having a plurality of spacers 416 of varying thickness, a technician will readily be able to change a defective seat assembly 412-420 while maintaining strict adherence to the tight tolerances found in these high, pressure valves. Thus, quick repair of defective cartridges is facilitated by this multi-element valve seat assembly.

Positioned above valve driver 10 is bonnet 426. Bonnet 426 includes opening 432 through which drive stem 12 extends. To maintain alignment and ensure a tight seal between bonnet 426 and drive stem 12, thrust bushing 428 and shaft seal 430 are positioned below bonnet 426 and around drive stem 12. The bonnet 426 also has a series of symmetrically disposed holes 434 about its periphery. These bonnet holes 426 correspond to holes 440 symmetrically positioned around a flange on the top of valve housing 450. A plurality of bonnet bolts 436 are extended through bonnet holes 434 and into holes 440 to fasten cartridge 400 to valve housing 450. An appropriate seal, e.g., an O-ring (not shown) disposed in groove 438 in the flange about the top of housing 450, seals the completed valve assembly.

On the bottom of cartridge 400 is cartridge base plate 442. Interposed between base plate 442 and driver 10 is driver thrust bushing 444, which aids in maintaining the alignment of the driver 10 within the valve cartridge 400. A top plate (not shown), but similar to base plate 442 extends from the lower side of bonnet 426. The cartridge 400 is held together by a plurality of screws 424 extending through and attaching inlet retainer plate 406 and outlet retainer plate 410 to the top plate (not shown) and base plate 442.

Figure 5:
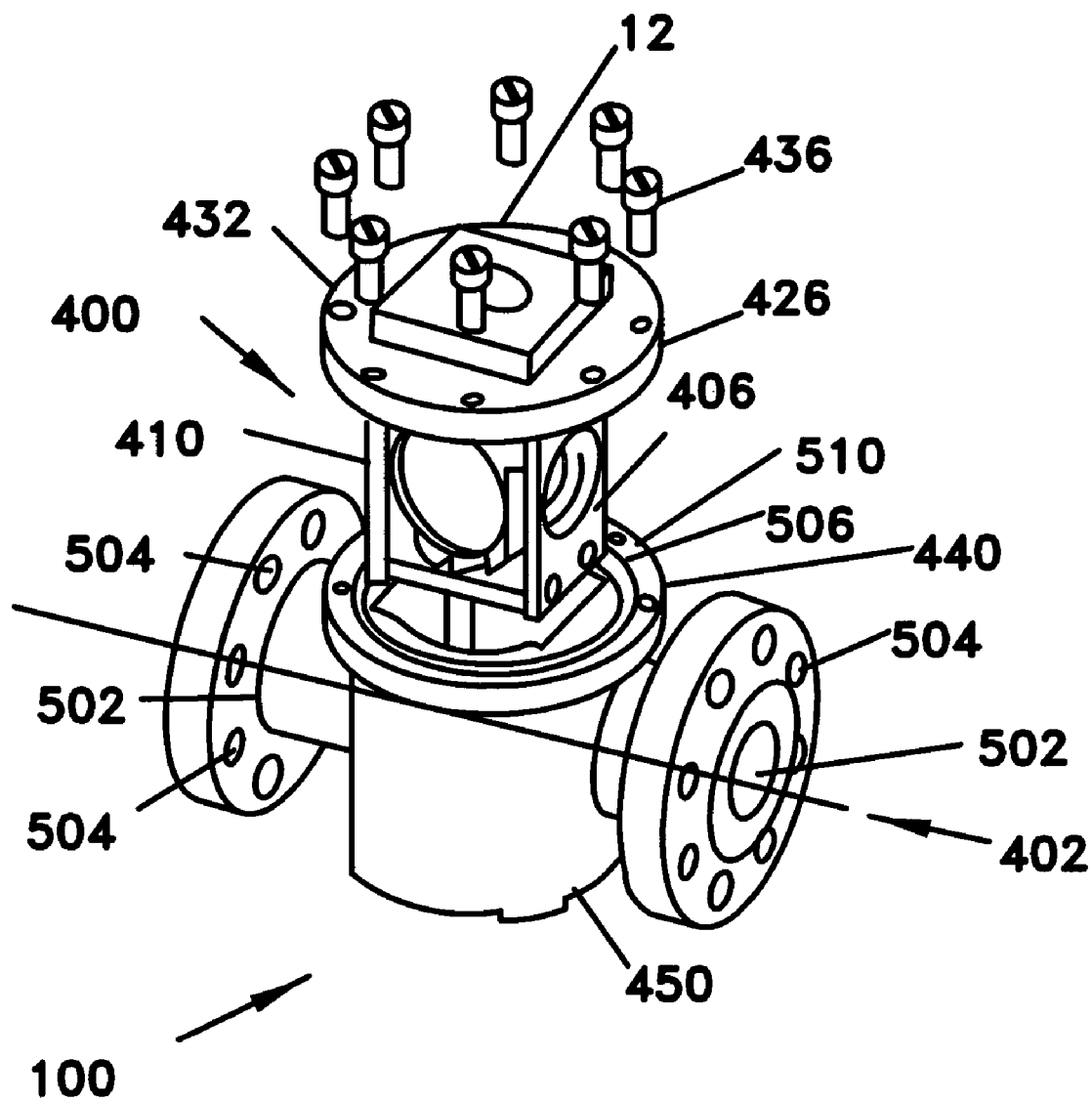
FIG. 5 is an exploded perspective view of a high-pressure, hemi-wedge cartridge valve in accord with the present invention.

FIG. 5 shows a perspective view of a valve 100 in accordance with the present invention. The assembled valve cartridge 400 of FIG. 4 is shown, along with valve housing 450. As previously described, cartridge 400 houses valve components including the valve driver 10, drive stem 12, hemi-wedge 50 and thrust ball 60. Of note in FIG. 5, drive stem 12 extends above the bonnet 426 for cooperation with a conventional actuator to control operation of the valve 100.

A plurality of holes 504 are symmetrically disposed about the periphery of pipeline connecting flanges 502 extending from both sides of valve housing 450. These flange holes 504 may be utilized to connect valve 100 to a pipeline. Alternatively, valve 100 may be welded into a pipeline. Those skilled in the art will recognize that valve 100 may be incorporated into any pipeline where it is desired to be able to adjust flow through the line by use of a quarter-turn valve.

Valve housing 450 also includes flange 510 having a plurality of holes 440 symmetrically disposed about its periphery. Further, valve housing 450 includes an internal cavity 506, sized to accommodate cartridge 400 below bonnet 426. It is preferable that flange 510 and internal cavity 506 be designed to closely fit the form of cartridge 400. When cartridge 400 is inserted within housing 450, the retainer plates 406 and 410 of cartridge 400 should be adjacent the sides of the internal cavity 506 and correspond closely to the dimensions of slots 462 and 464, respectively. When valve 100 is fully assembled, the bonnet 426 rests upon flange 510 forming the top of housing 450, while the main portion of cartridge 400 carrying the valve components is disposed within internal cavity 506.

Valve housing 450 has a fluid pathway 402 that allows a pipeline fluid to flow through housing 450. To allow fluid to pass through the assembled valve 100, fluid pathway 402 preferably aligns with and has roughly the same diameter as pathway 402 through cartridge 400 as shown in FIG. 4.

To fasten valve body 438 to cartridge 400, a plurality of bonnet bolts 436 are extended through holes 432 disposed symmetrically about the periphery of the bonnet and into corresponding holes 440 symmetrically disposed about flange 510 of housing 450. It should be noted that, while any conventional fastening means may be employed to secure cartridge 400 within housing 450, one of the advantages of the present invention is that the cartridge 400 is quickly and easily removable from housing 450 for convenient field repair. Accordingly, those skilled in the art will recognize that fastening means which are difficult to disengage or which could damage the various components of valve 100 are not preferred.

According to one embodiment of the present invention, cartridge 400 is designed so that it will fit within housing 450 in only a single, desired orientation. That is, the cartridge 400 may only be inserted into housing 450 facing in a single direction with respect to the housing. This prevents a technician from installing valve cartridge 400 backwards or sideways in a pipeline. As will be understood by those skilled in the art, if the perimeter of the cartridge base plate 434 forms a rectangle or square, and if the opening in flange 510 and the cavity 506 of housing 450 have corresponding dimensions, the cartridge 400 may fit into housing 450 in at least two different orientations. In this case, the cartridge 400 could be placed into housing 450 backwards or sideways. Such incorrect installation could prove disastrous in a high-pressure pipeline transporting flammable or explosive materials. To prevent such incorrect installation, the perimeter of cartridge 400 is preferably shaped with some irregularity, while the opening in flange 510 and the cross-section of cavity 506 are formed to correspond to and receive that irregularity in only one orientation.

This may be illustrated by a very simple embodiment, where the dimension of inlet retainer plate 406 across the flow path is slightly smaller then the dimension of outlet retainer plate 410 across the flow path. The openings in flange 510 and the cross-section of cavity 506 are configured to correspond to the cross section of cartridge assembly 400 defined by plates 406, 410 and 442. Slots 462 and 464 across the flow path of cavity 506 are formed with dimensions corresponding to plate 406 and 410, respectively. In this example, slot 462 is sufficiently wide to receive plate 406, but not wide enough to receive plate 410. The dimension of slot 462 across the inlet side of cavity 506 will correspond to that of inlet retainer plate 406, while that of slot 464 on the outlet side of cavity 506 will correspond to that of outlet retainer plate 410. The cartridge 400 will, accordingly, only fit within housing 450 in a single orientation, thus, preventing a technician from installing a cartridge with an incorrect orientation.

The foregoing description of the invention has been directed in primary part to a particular, preferred embodiment in accordance with the requirements of the patent statutes and for purposes of illustration. It will be apparent, however, to those skilled in the art that many modifications and changes in the specifically described valve 100 may be made without departing from the scope and spirit of the invention. For example, while the presently preferred system for ensuring that cartridge 400 is installed with the correct orientation employs the use of retainer plates 406 and 410 of differing dimensions, together with cooperating slots 462 and 464 of similar dimensions in cavity 506, many other similar systems might be employed to achieve the desired result. A groove might be formed in the opening of flange 510 and/or a side of cavity 506 for cooperation with a tongue extending from a side of base plate 442 or one of retainer plates 406 or 410. This is only one example of the many ways to achieve the desired result of preventing the installation of a cartridge in an incorrect orientation. Therefore, the invention is not restricted to the preferred embodiment illustrated but covers all modifications that may fall within the scope of the following claims.

What is claimed is:

1. A valve, comprising:
 a valve housing having an inlet and an outlet and being adapted to connect to a pipe, the housing having a cavity therein;
 a bonnet adapted to sealingly attach to the housing to form a top of the cavity and a drive stem sealingly extending through the bonnet;
 a cartridge having an inlet retaining plate and an outlet retaining plate adapted to fit within the cavity, the plates enclosing a driver, the driver being responsive to rotation of the drive stem, a thrust ball having a central bore, a spacer, a seal assembly having an inlet end and an outlet end, the outlet end of the seal assembly being adapted to move through an opening in the outlet retaining plate of the cartridge to form a seal around the outlet of the valve housing; and
 a rotatable valve member operatively connected with the driver, the rotatable valve member having curved surfaces forming a wedge, the wedge having an opening in a thinner section so as to allow flow through the valve housing when the valve member is rotated into an open position and having a thicker section such that the thicker section of the wedge seals against the inlet end of the seal assembly and the outlet end of the seal assembly seals against the valve housing to prevent flow through the valve housing when the valve member is rotated into a closed position.

2. The valve of claim 1 wherein the inlet retaining plate and the outlet retaining plate are designed so as to fit within the housing in only a selected orientation.

3. The valve of claim 1 wherein the inlet retaining plate and the outlet retaining plate have different widths.

4. The valve of claim 1 further comprising a side plate affixed between the inlet retaining plate and the outlet retaining plate.

5. The valve of claim 1 wherein the driver comprises a top plate having shoulders from which arms are suspended, so as to straddle the fluid flow path through the valve, the arms providing a surface for transmitting force to the rotatable valve member.

6. The valve of claim 5 wherein the driver further comprises a bottom plate joined to the arms, the bottom plate having a trunnion thereon.

7. The valve of claim 1 wherein the seal assembly forms a metal-to-metal seal with the wedge or the valve housing.

8. The valve of claim 1 wherein the seal assembly forms a seal with the wedge or the valve housing by employing a material comprising rubber or plastic.

9. The valve of claim 1 wherein the thickness of the spacer is selected to maintain an effective seal in the valve.

10. The valve of claim 1 wherein the curved surfaces of the wedge are portions of spheres.

11. A method for repairing a valve without removing the valve from a pipe, comprising:
 supplying a valve housing having an inlet and an outlet and being adapted to connect to the pipe, the housing having a cavity therein;
 supplying a bonnet adapted to sealingly attach to the housing to form a top of the cavity and a drive stem sealingly extending through the bonnet;
 supplying a cartridge having an inlet retaining plate and an outlet retaining plate adapted to fit within the cavity, the plates enclosing a driver, the driver being responsive to rotation of the drive stem, a thrust ball having a central bore, a spacer, a seal assembly having an inlet end and an outlet end, the outlet end of the seal assembly being adapted to move through an opening in the outlet retaining plate of the cartridge to form a seal around the outlet of the valve housing;
 supplying a rotatable valve member operatively connected with the driver, the rotatable valve member having curved surfaces forming a wedge, the wedge having an opening in a thinner section so as to allow flow through the valve housing when the valve member is rotated into an open position and having a thicker section adapted for sealing against the inlet end of the seal assembly and moving the outlet end of the seal assembly against the valve housing, so as to prevent flow through the valve housing when the valve member is rotated into a closed position; and
 when repair or replacement of the valve is indicated, relieving pressure in the valve housing, removing the bonnet and cartridge attached thereto, replacing the cartridge with a selected cartridge and reattaching the bonnet.

12. The method of claim 11 wherein the inlet retaining plate and the outlet retaining plate are designed so as to fit within the housing in only a selected orientation.

13. The method of claim 11 wherein the inlet retaining plate and the outlet retaining plate are of different widths.

14. The method of claim 11 further comprising a side plate affixed between the inlet retaining plate and the outlet retaining plate.

15. The method of claim 11 wherein the driver comprises a top plate having shoulders from which arms are suspended, so as to straddle the fluid flow path through the valve, the arms providing a surface for transmitting force to the rotatable valve member.

16. The method of claim 15 wherein the driver further comprises a bottom plate joined to the arms, the bottom plate having a trunnion thereon.

17. The method of claim 11 wherein the seal assembly forms a metal-to-metal seal with the wedge or the valve housing.

18. The method of claim 11 wherein the seal assembly forms a seal with the wedge or the valve housing by employing a material comprising rubber or plastic.

19. The method of claim 11 wherein the thickness of the spacer is selected to maintain an effective seal in the valve.

20. The method of claim 11 wherein the curved surfaces of the wedge are portions of spheres.

21. A valve, comprising:
a valve housing having an inlet and an outlet and being adapted to connect to a pipe, the housing having a cavity therein;
a bonnet adapted to sealingly attach to the housing to form a top of the cavity and a drive stem sealingly extending through the bonnet;
a cartridge having an inlet retaining plate and an outlet retaining plate adapted to fit within the cavity, the plates enclosing a means for driving the rotation of a rotatable valve member, a thrust ball having a central bore, a means for spacing, a means for moving a sealing surface through an opening in the outlet retaining plate of the cartridge to form a seal around the outlet of the valve housing, the rotatable valve member having curved surfaces forming a wedge, the wedge having an opening in a thinner section so as to allow flow through the valve housing when the valve member is rotated into an open position and having a thicker section such that the thicker section of the wedge seals against an inlet end of the means for moving the sealing surface and an outlet end of the means for moving the sealing surface is moved against the valve housing so as to prevent flow through the valve housing when the valve member is rotated into a closed position.

22. The valve of claim 21 wherein the inlet retaining plate and the outlet retaining plate are designed so as to fit within the housing in only a selected orientation.

23. The valve of claim 21 wherein the inlet retaining plate and the outlet retaining plate are of different widths.

24. The valve of claim 21 further comprising a side plate affixed between the inlet retaining plate and the outlet retaining plate.

25. The valve of claim 21 wherein the means for driving comprises a top plate having shoulders from which arms are suspended, so as to straddle the fluid flow path through the valve, the arms providing a surface or protuberance for transmitting force to the rotatable valve member.

26. The valve of claim 25 wherein the means for driving further comprises a bottom plate joined to the arms, the bottom plate having a trunnion thereon.

27. The valve of claim 21 wherein the means for moving the sealing surface includes a metal sealing surface.

28. The valve of claim 21 wherein the means for moving the sealing surface includes a rubber or polymer sealing surface.

29. The valve of claim 21 wherein the thickness of the means for spacing is selected to maintain a seal to prevent flow through the valve housing.

30. A cartridge for a valve having a housing and a cavity therein, comprising:
an inlet retaining plate and an outlet retaining plate adapted to fit within the cavity, the plates enclosing a driver, the driver being responsive to rotation of a drive stem of the valve, a thrust ball having a central bore, a spacer, a seal assembly having an inlet end and an outlet end, the outlet end of the seal assembly being adapted to move through an opening in the outlet retaining plate of the cartridge to form a seal around the outlet of the valve housing; and
a rotatable valve member operatively connected with the driver, the rotatable valve member having curved surfaces forming a wedge, the wedge having an opening in a thinner section so as to allow flow through the valve housing when the valve member is rotated into an open position and having a thicker section such that the thicker section of the wedge seals against the inlet end of the seal assembly and the outlet end of the seal assembly seals against the valve housing to prevent flow through the valve housing when the valve member is rotated into a closed position.

31. The cartridge of claim 30 wherein the inlet retaining plate and the outlet retaining plate are designed so as to fit within the housing in only a selected orientation.

32. The cartridge of claim 30 wherein the inlet retaining plate and the outlet retaining plate have different widths.

33. The cartridge of claim 30 further comprising a side plate affixed between the inlet retaining plate and the outlet retaining plate.

34. The cartridge of claim 30 wherein the driver comprises a top plate having shoulders from which arms are suspended, so as to straddle the fluid flow path through the valve, the arms providing a surface for transmitting force to the rotatable valve member.

35. The cartridge of claim 34 wherein the driver further comprises a bottom plate joined to the arms, the bottom plate having a trunnion thereon.

36. The cartridge of claim 30 wherein the seal assembly forms a metal-to-metal seal with the wedge or the valve housing.

37. The cartridge of claim 30 wherein the seal assembly forms a seal with the wedge or the valve housing by employing a material comprising rubber or plastic.

38. The cartridge of claim 30 wherein the thickness of the spacer is selected to maintain an effective seal in the valve.

39. The cartridge of claim 30 wherein the curved surfaces of the wedge are portions of spheres.

* * * * *